United States Patent [19]

Williams et al.

[11] 4,425,973
[45] Jan. 17, 1984

[54] TRASH CLEARING DISC ASSEMBLY FOR PLANTERS

[75] Inventors: Donald E. Williams; Forrest E. Robertson, both of Garden City, Kans.

[73] Assignee: Acra-Plant, Inc., Garden City, Kans.

[21] Appl. No.: 324,434

[22] Filed: Nov. 24, 1981

[51] Int. Cl.³ .............................................. A01C 5/06
[52] U.S. Cl. .................................... 172/574; 172/744; 172/774
[58] Field of Search ............... 172/177, 166, 763, 774, 172/184–187, 575, 574, 604, 540, 545, 555, 156, 150, 1; 111/85, 87, 88, 73

[56] References Cited

U.S. PATENT DOCUMENTS

| | | | |
|---|---|---|---|
| 588,787 | 8/1897 | Atkins | 172/575 |
| 1,024,208 | 4/1912 | Langley | 172/574 |
| 1,169,183 | 1/1916 | Orndorf | 172/574 X |
| 2,439,449 | 4/1948 | Caffese | 172/575 X |
| 2,486,442 | 11/1949 | Silver | 172/186 |
| 4,131,162 | 12/1978 | Schmitz | 172/138 |
| 4,295,532 | 10/1981 | Williams | 172/574 |

Primary Examiner—Richard J. Johnson
Attorney, Agent, or Firm—Schmidt, Johnson, Hovey & Williams

[57] ABSTRACT

A double disc, debris-clearing assembly has a suspension member for releasable attachment to a farm implement and on which is rigidly secured an upright standard. A guide rigid to and depending from the suspension member beneath the standard has a tiltable channel element releasably mounted thereon and provided with an upwardly-extending strap for varying its height along the guide. An adjustable connection is utilized between the strap and the standard. A pair of interconnected brackets carried by the channel element are provided with disc mounts which may, in turn, be adjusted to vary the positions of the discs relative to each other and to their brackets. Accordingly, the suspension member, the standard, the guide, the strap and the channel element are common to the bracket unit and, therefore, the discs.

7 Claims, 7 Drawing Figures

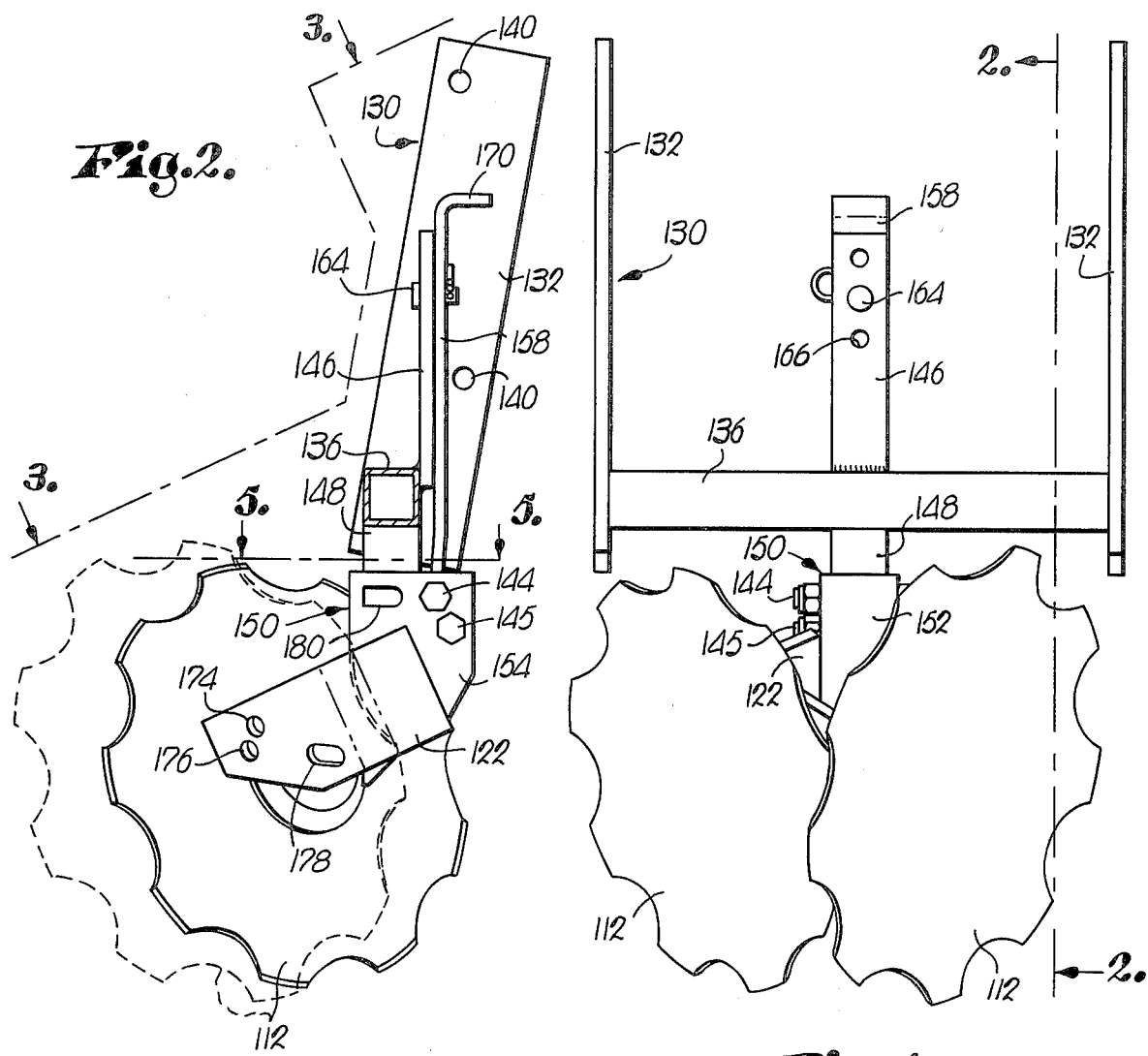
Fig. 2.
Fig. 1.
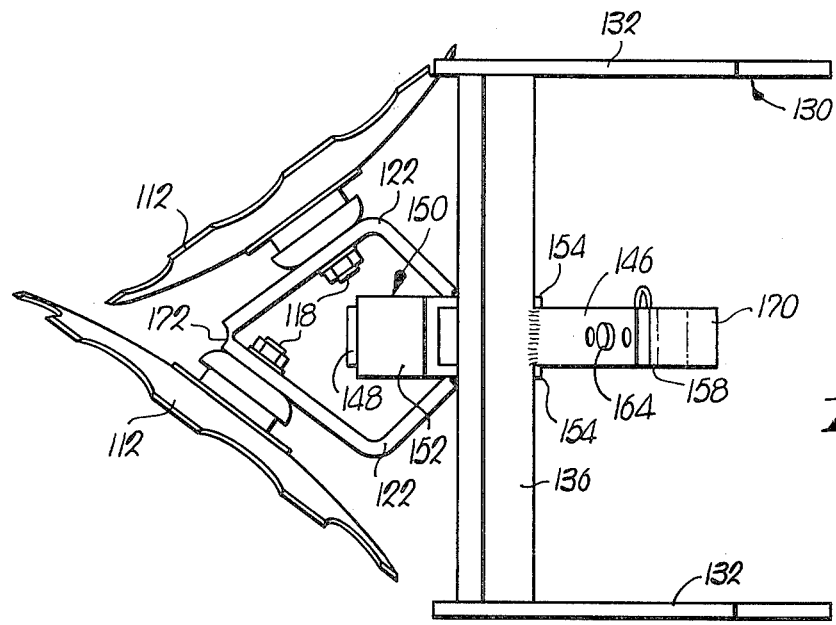
Fig. 3.

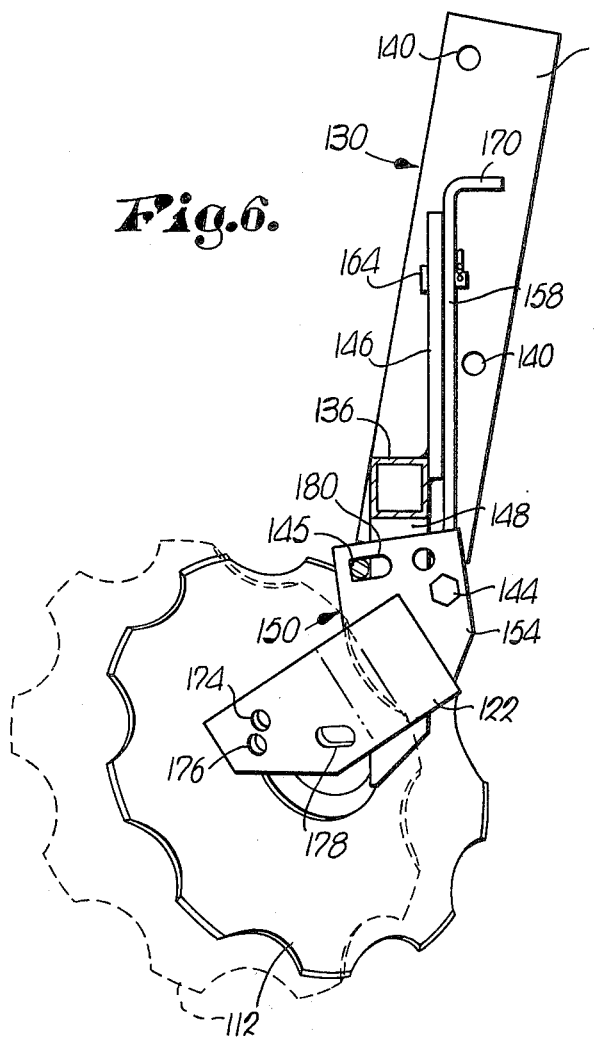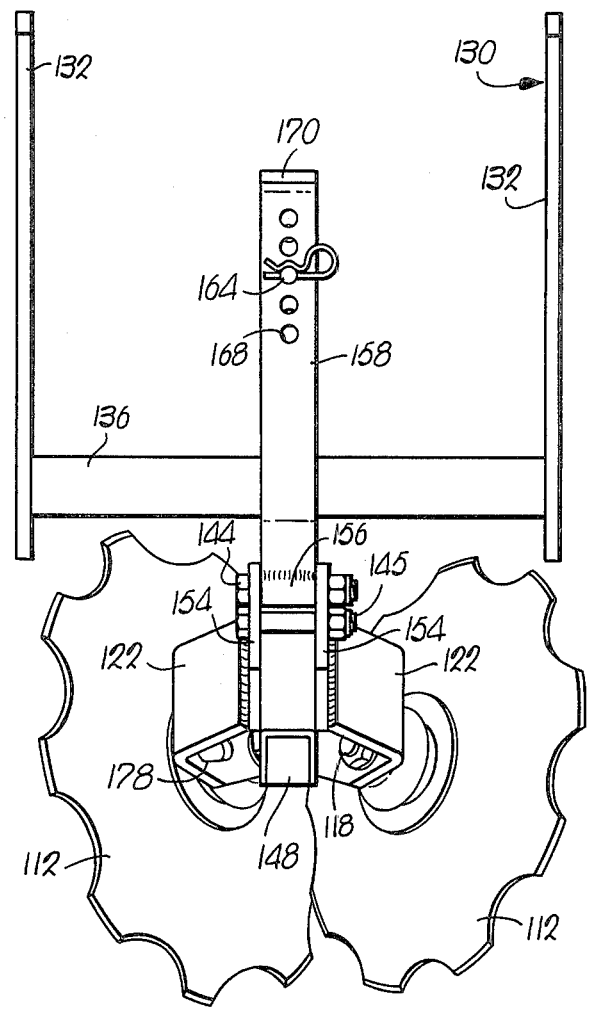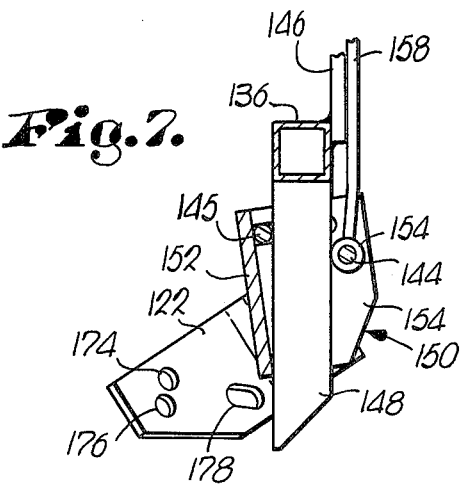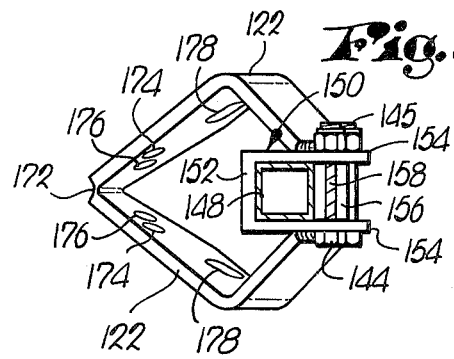

TRASH CLEARING DISC ASSEMBLY FOR PLANTERS

Our present invention relates to improvements on the single disc trash clearing attachment to furrow openers disclosed in U.S. Letters Pat. No. 3,718,191 owned by the assignee hereof, but adapted herein to be used separately from and ahead of the furrow opener of a planting implement. Insofar as planters are concerned, we are familiar with U.S. Letters Pat. No. 2,579,988 provided with dirt collecting discs, and No. 3,362,361 equipped with a pair of trash cutting and removing discs disposed in advance of a furrow-opening tool.

Rolling coulters for moldboard plows are known to be old as provided, for instance in U.S. Letters Pat. No. 682,505; No. 2,683,404 and No. 3,115,192.

Other relevant prior art of lesser significance includes U.S. Letters Pat. No. 747,754 having a disc-type marker; No. 2,706,362 relating to a trencher with an incising disc; No. 2,748,535 using drums and conveyors for cutting and moving trash or crop residue laterally in opposite directions; No. 2,757,593 disclosing a disc cultivator; and No. 2,842,078 directed to a furrow-opening disc. Examples of furrow openers of the kind with which our instant invention may be used are disclosed in U.S. Letters Pat. No. 3,154,030; No. 3,217,674 and No. 3,509,947, all owned by the assignee hereof, as well as Nos. 3,380,411 and 3,380,412.

We are also familiar with U.S. Letters Pat. No. 588,787 of Aug. 1897 and T862,011 of May, 1969, as well as United Kingdom Pat. No. 913,496 of March, 1960.

In accordance with our present improvements, the height of the trash-clearing, double discs can be varied by releasing a single strap from an upright standard forming a part of a U-shaped suspension member. By use of the strap, the discs can then be raised and lowered as a unit before reattaching the strap to the standard.

During such height adjustment a channel element slides vertically along a guide which depends from the suspension member below the standard. Disc mounting brackets are provided on the channel element, and the attitudes of the discs may be varied, not only at their mounts on the brackets, but by changing the position of the channel element relative to the guide.

In the drawings:

FIG. 1 is a front elevational view of a debris-clearing unit made in accordance with our present invention;

FIG. 2 is a cross-sectional view taken on line 2—2 of FIG. 1;

FIG. 3 is a view taken on line 3—3 of FIG. 2;

FIG. 4 is a rear elevational view;

FIG. 5 is a detailed cross-sectional view taken on line 5—5 of FIG. 2 with the discs removed;

FIG. 6 is a cross-sectional view similar to FIG. 2 showing a different position of certain component parts; and FIG. 7 is a fragmentary, vertical, cross-sectional view with the discs removed taken at a different position from FIGS. 2 and 6.

Our present invention is related to U.S. Pat. No. 4,295,532, dated Oct. 20, 1981, incorporated herein by reference as may be helpful or required for a better understanding of the instant improvements.

A U-shaped suspension member 130 has a pair of legs 132 connected by a crosshead 136, the legs 132 being provided with perforations 140 for reception of fasteners (not shown) to permit releasable connection of the member 130 to the implement with which the debris-clearing unit is to be used.

A standard 146 rigid to the crosshead 136 medially thereof extends upwardly from the crosshead 136 between the legs 132, and a guide 148, also rigid to the crosshead 136, depends from the latter directly below the standard 146.

A U-shaped channel element 150 in looped relationship to the guide 148 has an upright bight 152 and a pair of spaced, rearwardly-extending legs 154 between which is disposed a short tube 156 rigid to the lower end of an upright strap 158. A pair of bolts 144 and 145 interconnect the legs 154, the bolt 144 passing through the tube 156. The strap 158 overlaps the standard 146 and is connected thereto by a pin 164 passing through selected holes 166 and 168 in the standard 146 and the strap 158 respectively. A handle 170 on the strap 158 facilitates raising and lowering of the element 150 when the pin 164 is removed.

A pair of essentially L-shaped, downwardly and forwardly inclined brackets 122, rigid to the outer faces of the legs 154, converge to a leading, inclined line of interconnected merger 172. A pair of notched discs 112 have axles 118 releasably mounted on the brackets 122. Each bracket 122 has a pair of front apertures 174 and 176 and a rear slot 178 all adapted to receive the axles 118.

The attitudes of the discs 112 relative to each other and to the ground may be changed to adapt the unit for various fields and other conditions. Moreover, the adjustments shown in the drawings permit additional variances in such attitudes not made possible by prior suggestions.

In FIGS. 2-5 both of the bolts 144 and 145 are shown behind the guide 148 such that the bight 152 bears against the front face of the guide 148. However, the element 150 may be held in a position tilted forwardly as shown in FIGS. 6 and 7 by lowering of the bolt 144 and placement of the bolt 145 in front of the element 150, passing through slots 180 in the legs 154 thereby tilting the brackets 122 and the discs 112.

The axle 118 of the trailing disc 112 is shown within the slot 178 of its bracket 122, whereas the axle 118 of the leading disc 112 is shown within the lower, forward aperture 176 of its bracket 122, it being understood that such arrangements may be changed as needed or desired.

In all such selected attitudes of various components, height is selectable by raising and lowering of the entire assembly supported by the strap 158 through replacement of the pin 164 in any pair of aligned holes 166, 168.

We claim:

1. A debris-clearing unit for farm implements comprising:
    a suspension member adapted for connection with an implement and provided with a crosshead;
    a standard secured to the crosshead and extending upwardly therefrom;
    a guide secured to the crosshead and depending therefrom;
    a channel element in looped relationship to the guide;
    a strap attached to the standard and to said element and extending upwardly from the latter;
    a pair of brackets rigid to said element;
    a disc for each bracket respectively; and
    a mount for each disc respectively rotatably securing the same to its corresponding bracket with the discs converging forwardly toward the center of their normal path of travel.

2. The invention of claim 1, one of the discs leading the other disc and overlapping the latter at the forward zone of convergence of the discs, one of said mounts having means for varying the distance between the discs at said zone of convergence.

3. The invention of claim 1, one of said mounts having means for varying the height of its disc.

4. The invention of claim 1, the attachment of the strap to the standard having means for varying the height of said element along the guide.

5. The invention of claim 1; and releasable means clamping said element to the guide.

6. The invention of claim 1; and releasable means holding said element tilted relative to the guide.

7. The invention of claim 1, said brackets being rigidly interconnected between the discs forwardly of said element.

* * * * *